United States Patent
Ringstrom et al.

(10) Patent No.: US 9,419,730 B2
(45) Date of Patent: Aug. 16, 2016

(54) COMMUNICATIONS UNIT AND METHOD

(75) Inventors: Markus Ringstrom, Stockholm (SE); Johan Axnas, Solna (SE); Robert Baldemair, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 487 days.

(21) Appl. No.: 12/741,330

(22) PCT Filed: Apr. 14, 2008

(86) PCT No.: PCT/SE2008/050422
§ 371 (c)(1), (2), (4) Date: May 4, 2010

(87) PCT Pub. No.: WO2009/061254
PCT Pub. Date: May 14, 2009

(65) Prior Publication Data
US 2010/0239044 A1 Sep. 23, 2010

Related U.S. Application Data

(60) Provisional application No. 60/985,755, filed on Nov. 6, 2007.

(51) Int. Cl.
*H04J 3/06* (2006.01)
*H04B 15/02* (2006.01)
*H04L 1/00* (2006.01)

(52) U.S. Cl.
CPC ............. *H04B 15/02* (2013.01); *H04L 1/0006* (2013.01); *H04L 1/0083* (2013.01)

(58) Field of Classification Search
CPC ...... H04B 15/02; H04L 1/0006; H04L 1/0083
USPC .................... 370/319, 347, 503, 508
See application file for complete search history.

(56) References Cited

U.S. PATENT DOCUMENTS 6,272,348 B1   8/2001  Saario et al.
6,470,006 B1 * 10/2002  Moulsley ................ 370/347
(Continued)

FOREIGN PATENT DOCUMENTS

GB   2292048 A   2/1996
GB   2428921 A   2/2007
(Continued)

OTHER PUBLICATIONS

3rd Generation Partnership Project. "Initial Cell Search: Analysis and Simulations." 3GPP TSG-RAN WG1 #47, R1-063431, Riga, Latvia, Nov. 6-10, 2006.

*Primary Examiner* — Phuc Tran
(74) *Attorney, Agent, or Firm* — Coats & Bennett, PLLC

(57) ABSTRACT

The effects of interference between a communication system operating in a frequency area and another system sending out pulses affecting the frequency area can be handled by means of a communication unit (RBS1, MT1) for use in a first cellular communications system, in which at least one type of system sensitive data is transmitted at pre-determined points in time, said communications unit comprising transmitting means (14, 24) arranged to transmit said system sensitive data and processing means (11, 21) arranged to control the transmitting means to transmit the system sensitive data at new points in time different from the predetermined points in time, instead of at said predetermined points in time, to reduce the risk of interference from a second system operating in the same frequency range as the first cellular communications system.

21 Claims, 3 Drawing Sheets

(56) References Cited

U.S. PATENT DOCUMENTS

| | | | |
|---|---|---|---|
| 7,151,944 B2* | 12/2006 | Hashem et al. | 455/502 |
| 7,366,128 B2* | 4/2008 | Hundal et al. | 370/328 |
| 2004/0223467 A1 | 11/2004 | Hundal et al. | |
| 2004/0264421 A1* | 12/2004 | Sato et al. | 370/337 |
| 2009/0052353 A1* | 2/2009 | D'Amico et al. | 370/280 |
| 2009/0323642 A1 | 12/2009 | Tanno et al. | |
| 2010/0226295 A1* | 9/2010 | Sun et al. | 370/294 |
| 2010/0226358 A1* | 9/2010 | Cordeiro | 370/350 |

FOREIGN PATENT DOCUMENTS

| | | |
|---|---|---|
| JP | 07162948 A | 6/1995 |
| JP | 2005-197765 A | 7/2005 |
| JP | 2007221743 A | 8/2007 |
| WO | 9949587 A1 | 9/1999 |

* cited by examiner

COMMUNICATIONS UNIT AND METHOD

TECHNICAL FIELD

The present invention relates to a communications unit, such as a radio base station or a mobile terminal for use in a cellular communications system. The invention also relates to a method for use in such a system

BACKGROUND AND RELATED ART

One of the scarcest resources in current and future wireless communication systems for providing more capacity and higher data rates is available frequency spectrum. A possible way forward to meet the demands for more spectrum is to use the limited spectrum in a more efficient way, e.g. through spectrum sharing. This means that different systems are allocated to the same spectrum, the systems possibly being of completely different kinds (e.g. a radar system and a terrestrial mobile communication system). To be able to share spectrum, the interference from the other systems must be managed in a proper way.

In current mobile communication systems, interference from other systems is not dealt with in any particular way. It is handled as thermal noise or intra-system interference, and hence the co-existence with other systems within the same spectrum is virtually impossible. Due to the fact that interference affecting reference symbols, control signalling, synchronization symbols and user data affects the system differently, a strong interfering pulse from e.g. a radar system, though very short in time, might severely impact the performance of the system by affecting the synchronization symbols, reference symbols and/or control signalling. This is because achieving synchronization is a necessary first step, reference symbols are assumed to be representative for the data and control signalling is used for decoding data.

The document 3GPP R1-063431 entitled "Initial cell search: analysis and simulations" which is a standardization proposal from Qualcomm, proposes way of modifying the position in time of the synchronization channel in order to avoid the superposition of synchronization channels from different cells of the same system, but does not propose any solution to the problem of interference from other systems having different characteristics and using a different frequency band.

SUMMARY OF THE INVENTION

The invention is primarily intended to solve the problem of deploying a (mobile) communication system in a frequency spectrum where there is interference present from another system (preferred embodiment). The interference may be co-channel interference, adjacent interference or any other type of interference. The other system is considered an interferer to the mobile communication system and is assumed to transmit short radio pulses with high energy. A pulse is considered short if its duration is considerably shorter than the time between successive pulses. Alternatively, a pulse may be considered short if it is shorter than the interval between, or period of, resources allocated to certain signals vital to the system (for example, synchornization signalling, control signalling, or reference symbols). A radio pulse with the described characteristics will be referred to as a Strong Interfering Pulse (SIP) for the remainder of this document. The interpretation of the phrase "considerably shorter" may vary. In some situations the pulse duration should be shorter than one half of the time between the starting points of two consecutive pulses. In other contexts the pulse duration should possibly be shorter than one third of the time between the starting points of two successive pulses.

The invention relates to a communication unit for use in a first cellular communications system, in which at least one type of system sensitive data is transmitted at predetermined points in time, said communications unit comprising transmitting means arranged to transmit said system sensitive data and processing means arranged to control the transmitting means to transmit the system sensitive data at new points in time different from the predetermined points in time, instead of at said predetermined points in time, to reduce the risk of interference from a second system operating in the same frequency range as the first cellular communications system. As will be obvious to the skilled person, the inventive idea can be applied in other types of mobile or wireless communications systems as well.

The invention also relates to a communication method for use in a first cellular communications system, in which at least one type of system sensitive data is transmitted at predetermined points in time, said method comprising the step of determining new points in time different from the pre-determined points in time, for transmitting said at least one type of system sensitive data and transmitting said at least one type of system sensitive data at said new points in time instead of at said predetermined points in time, to reduce the risk of interference from a second system operating in the same frequency range as the first cellular communications system.

The second system may, for example be a radar system, transmitting radar pulses in a frequency range that will affect the cellular system.

In one embodiment, the processing means is arranged to calculate said new points in time on the basis of a minimum interval between the interfering pulses. In an alternative embodiment, the processing means is arranged to select the new points in time from a table stored in association with the processing means.

The method is particularly useful if said predetermined points in time exhibit a periodicity or regularity, in which case the processing means is preferably arranged to calculate the new points in time so that they have less periodicity or regularity.

In a communications system in which data is transmitted in frames, said at least one type of system sensitive data may be arranged to be transmitted at least a first and a second predetermined point in time in one frame. In this case, the processing means may arranged to calculate a new point in time only for the second predetermined point in time.

If said system sensitive data comprises a first and a second synchronization symbol at different positions in the frame, one of the first or second synchronization symbols may be shifted within the frame. In this case, the processing means may be arranged to include in one of the synchronisation symbols information about the position of this, and/or the other, synchronization symbol relative to the frame, or an indicator identifying such a position from a predetermined set of positions. This will facilitate the searching for the next synchronization symbol or another future synchronization symbol, by the receiver. In current LTE systems, a frame comprises a first primary and a first secondary synchronization symbol, grouped together, and a second primary and a second secondary synchronization symbol, also grouped together. In the prior art the group comprising the two first symbols and the group comprising the two second symbols are evenly spaced in time. Therefore, the first and second secondary synchronization symbols are not identical, so that the secondary synchronization symbols carry information identifying the position in the frame. According to an embodiment of the invention at least one of the first primary synchronization symbol, the second primary synchronization symbol, the first secondary synchronization symbol and the second secondary synchronization symbol has information about the position of at least one of the synchronization symbols within the frame. In a preferred variant of this embodiment, the second secondary synchronization symbol carries information about its own position within the frame.

This embodiment is particularly useful in situations when the position of the first synchronization symbols or the secondary synchronization symbols is not always the same within a frame. The position can vary over time, or different positions may be used in different geographical areas, for example in dependence of whether interfering pulses are present at a particular time, or within a particular area.

The processing means may be arranged to determine said new points in time, for example, in a pseudo-random time fashion, or on the basis of the period of one frame and the interval between interference pulses from the second system.

The processing means may be arranged to determine said new points in time on the basis of the period of one frame and several different intervals between interference pulses from the second system.

The communication unit according to the invention may be a radio base station, or a mobile terminal.

The invention also relates to a cellular communications system comprising at least a mobile terminal and a radio base station according to the above.

By employing the technique of the invention, more of the scarce resource radio spectrum will be available for mobile communication systems, since the effects of interference from other systems can be avoided by avoiding transmission of sensitive data at points in time when there is such interference. Examples of spectrum bands that could be available are guard bands of frequency bands where different kinds of radars are operated today.

BRIEF DESCRIPTION OF THE DRAWINGS

The invention will be described in more detail in the following, by way of example and with reference to the appended drawings in which.

DETAILED DESCRIPTION OF EMBODIMENTS

Figure 1:
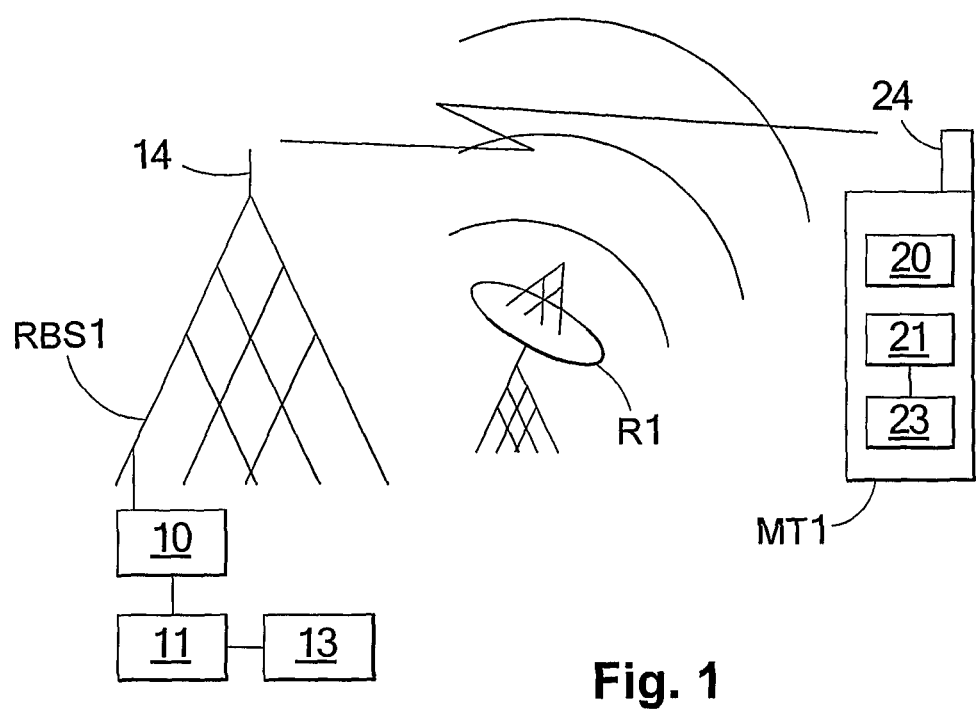
FIG. 1 illustrates, schematically, a situation where two different cellular systems share the same frequency spectrum and therefore interfere with each other.

FIG. 1 shows a simplified view of a cellular communications system, represented by a radio base station RBS1 in communication with a mobile terminal MT1. In this example, a radar system R1 operates in a frequency spectrum so that the radar pulses may cause interference in the cellular communications system. It should be understood that the interfering system could be any kind of system sending out pulses in a frequency spectrum that overlaps at least partially, or otherwise affects, the frequency spectrum of the cellular communications system.

According to the invention, at least one of the communicating units of the communications system, that is, the radio base station RBS1 or the mobile terminal MT1, comprises means for detecting interfering signals from the other system and for taking appropriate action. In FIG. 1, the radio base station RBS1 comprises calculating means 10 for detecting the presence of an interfering signal from the other communications system, and processing means 11 for determining and taking appropriate action based on the detection of the interfering signal. Information about the presence of an interfering signal could instead be received from another unit in the communications system (not shown).

It is assumed that the communications system sends out at least one type of system sensitive data at regular points in time, for example once, or a fixed number of times, in each frame. In this case, the processing means 11 is arranged to determine new points in time at which to send the system sensitive data, so that the interfering pulses can be avoided. This may be done by calculating the new points in time as will be discussed in more detail below. Alternatively, possible new points in time may be stored in a table 13 in association with the processing means. In this case, if an interfering signal is detected, the processing means will determine that the timing of the transmission of system sensitive data should be changed and select new points in time for this transmission from the table. The table may comprise different entries for different minimum spacings between the interfering pulses in accordance with the discussion below.

Similarly, the mobile terminals MT1 of the first system comprises detection means 20 for detecting the presence of an interfering signal from the other communications system, and processing means 21 for determining and taking appropriate action based on the detection of the interfering signal, in particular for determining new points in time, by calculation or by looking in a table 23. Each of the radio base station and the mobile terminal comprises transmission means, represented in FIG. 1 by antennas 14, 24, respectively, for transmitting the signals at the new points in time instead of the predetermined points in time. It is of course possible to change the points in time only for some of the system sensitive information.

There are a number of design measures that can be taken in order to adapt a communication system for a situation where SIP interference is present. One measure is to make sure that a regular SIP does not affect system sensitive data every time. This can be accomplished by two different methods. One is to transmit the system sensitive data in a pseudo-random time fashion. In this case the interfering signal does not have to be periodic, or if it is periodic, the periodicity does not have to be known. Another method is to have a mechanism for interchanging system sensitive data with user data, or possibly with other system sensitive data, and choose the best placement for the system sensitive data. This is of course dependent on a way of communicating the change to the terminal and assumes that the SIP is more or less predictable.

For example, the synchronization symbols can be transmitted less regularly, i.e. not every $N^{th}$ frame for example. This is discussed in more detail below.

Similarly, reference symbols and control information could be transmitted less regularly. In the following an example of the inventive method applied to a system using first and second primary synchronization symbols will be described. As will be understood by the skilled person, similar methods can be applied to other types of symbols or information, that is allocated to resources having a periodic or regular structure, for example, reference symbols or control information.

Furthermore, system sensitive data can have different protection compared to the standard practice of today. Control information can e.g. be more interleaved over time, rather than over frequency only. Reference symbols can be placed denser and possibly transmitted with lower power.

According to a first preferred embodiment irregular spacing of the synchronization symbols is used to ensure that not all synchronization symbols are disturbed by interfering pulses.

In the following the invention will be discussed with reference to a Long Term Evolution (LTE) system. LTE is described, for example, in 3GPP TS 36.201 "LongTerm Evolution (LTE) physical layer; General description".

Figure 2:
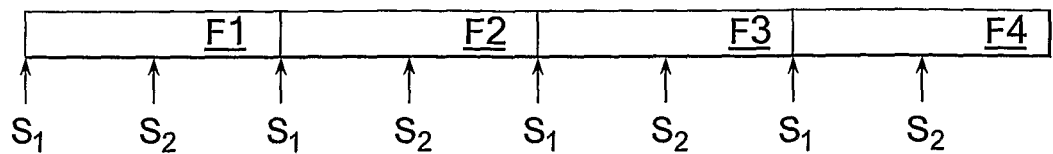
FIG. 2 shows, schematically, the position in time of the first and second primary synchronization symbol within OFDM frames according to the prior art.

FIG. 2 illustrates the spacing of synchronization symbols in an LTE system according to the prior art. In this system, the transmission is structured into frames, each or which has a length of T=10 ms. In FIG. 3, four frames F1, F2, F3 and F4 are shown. There are two primary synchronization symbols (orthogonal frequencydivision multiplexing (OFDM) symbols) per frame, occurring at times s and s+T/2. The primary synchronization symbols are thus regularly spaced with an interval of T/2. Although s is nonzero in LTE, we will in the following let s=0 to simplify the notation. If desired, this may be considered in terms of redefining the start of the frame to occur at the first primary synchronization symbol of the frame, and it does not affect the following reasoning. For simplicity, therefore, FIG. 2 shows the first primary synchronization symbol $s_1$ at the beginning of each frame, although this is not usually the case. The second primary synchronization symbol $s_2$ is therefore located in the middle of each frame. In a real system, the first and second primary synchronization symbols would be located at regular intervals but not exactly at the beginning and middle of each frame, respectively.

With the regular spacing of the primary synchronization symbols, in the worst case, a SIP with a regular spacing may destroy all synchronization symbols, and make the system inoperable. The situation can be mitigated by using another position than T/2 for the second primary synchronization symbol of each frame. If chosen properly, one can ensure that the regularly spaced SIP cannot affect both the first and the second primary synchronization symbol of every frame. The new position should preferably be the same in the entire system (and even in all LTE systems). However, a new position that works with one SIP spacing, might not work with another SIP spacing. If the SIP has a spacing of T/N, where N is an integer, the SIP will affect all the positions 0, T/N, 2T/N, 3T/N, . . . (N−1)T/N, T. Here it is assumed that the SIP affects the first primary synchronization symbol of each frame; if it does not, the problem is already solved.

The problem is even further complicated by the fact that, unless the SIP is much shorter than an OFDM symbol, not only the above-mentioned symbols, but also one or more adjacent symbols, may be affected.

Fortunately, it is possible to find a position for the second primary synchronization symbol that will not collide with any regularly spaced SIP with an interval larger than or equal to t=T/M, where M is a given integer, and a SIP duration of up to approximately t/4. (A realistic case is t in the order of 1 ms.) First consider the simplest case where the SIP duration is very short, much less than t/4. Then the risk of collision can be removed by positioning the second primary synchronization symbol in any of the open intervals (0,T/M), (T/2−T/(2M),T/2), (T/2, T/2+T/(2M)), or (T−T/M,T).

Figure 3A:
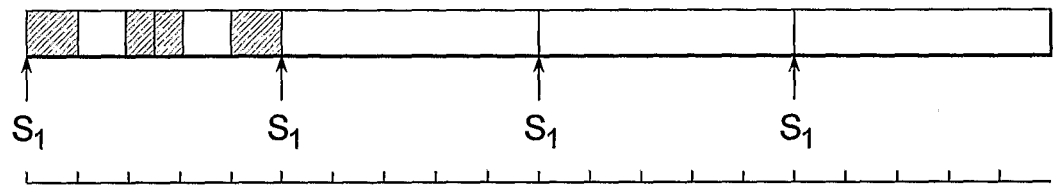
FIGS. 3a-3c show, schematically, the position in time of the first and second primary synchronization symbols in relationship to periodic interfering pulses at different intervals.
Figure 3B:
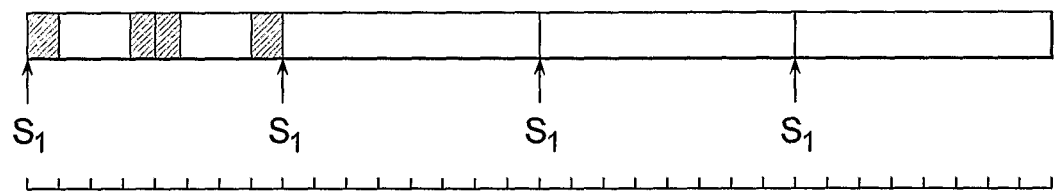
Figure 3C:
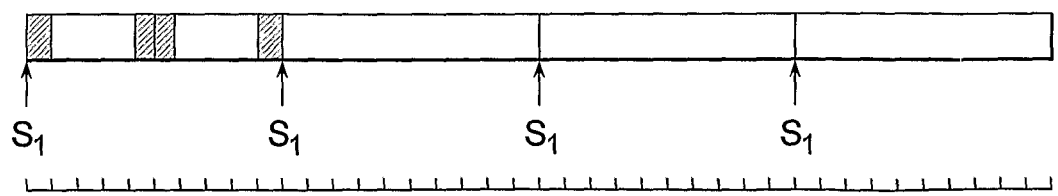

FIGS. 3a-3c illustrate the situation discussed above, for three different values of M. Each FIGS. 3a-3c illustrates the same four frames as in FIG. 2 and below the frames, the minimum interval between the interfering pulses along the same time line. The calculated intervals in which the synchronization symbols may be placed are shown in Table 1 below.

In FIG. 3a, M=5, that is, the interval between two interference pulses is equal to or larger than ta=10 ms/5=2 ms.

In FIG. 3b, M=8, that is, the interval between two interference pulses is equal to or larger than tc=10 ms/8=1.25 ms In FIG. 3c, M=10, that is, the interval between two interference pulses is equal to or larger than tc=10 ms/10=1 ms In each of the FIGS. 3a-3c the intervals of each frame corresponding to the open intervals discussed above, that is, (0,T/M), (T/2−T/(2M),T/2), (T/2, T/2+T/(2M)), or (T−T/M, T) are shaded. Hence, the shaded portions of the frames of FIGS. 3a-3c indicate the portion of each frame in which the second primary synchronization symbol may be placed to ensure that one of the synchronization symbols of each frame can always be received without interference in the relevant situation. As can be seen, as M increases, the minimum intervals between the interfering pulses is reduced, and the shaded portions indicating the portions in which the second primary synchronization symbol may be placed are reduced as well. This is also illustrated in Table 1, which lists the values of the intervals for three different values of M=5, 8 and 10, respectively, assuming that T=10 ms.

TABLE 1

|  | M = 5<br>T/M = 2 ms | M = 8<br>T/M = 1.25 ms | M = 10<br>T/M = 1 ms |
| --- | --- | --- | --- |
| 0; T/M | 0 ms; 2 ms | 0 ms; 1.25 ms | 0 ms; 1 ms |
| T/2 − T/2M; T/2 | 4 ms; 5 ms | 4.4 ms; 5 ms | 4.5 ms; 5 ms |
| T/2; | 5 ms; 6 ms | 5 ms; 5.6 ms | 5 ms; 5.5 ms |
| T/2 + T/2M |  |  |  |
| T − T/M; T | 8 ms; 10 ms | 8.75 ms; 10 ms | 9 ms; 10 ms |

In order to minimize the average time one has to wait to find the first synchronization symbol in a system where SIPs are not an issue, the intervals (T/2−T/(2M),T/2) and (T/2, T/2+T/(2M)) are preferred. If the SIP has a non-negligible duration, the possible intervals are smaller. However, up to a SIP duration of t/4, the positions T/2−T/(4M) and T/2+T/(4M) are still usable; these are thus the optimum positions for the second primary synchronization symbol.

Moreover, the situation can be even further improved by alternating between these two positions from frame to frame. One can then guarantee that at least one primary synchronization symbol in every other frame escapes the SIP as long as the SIP duration is shorter than t/2 (that is a situation where the SIP is active as much as 50% of the time).

Figure 4:
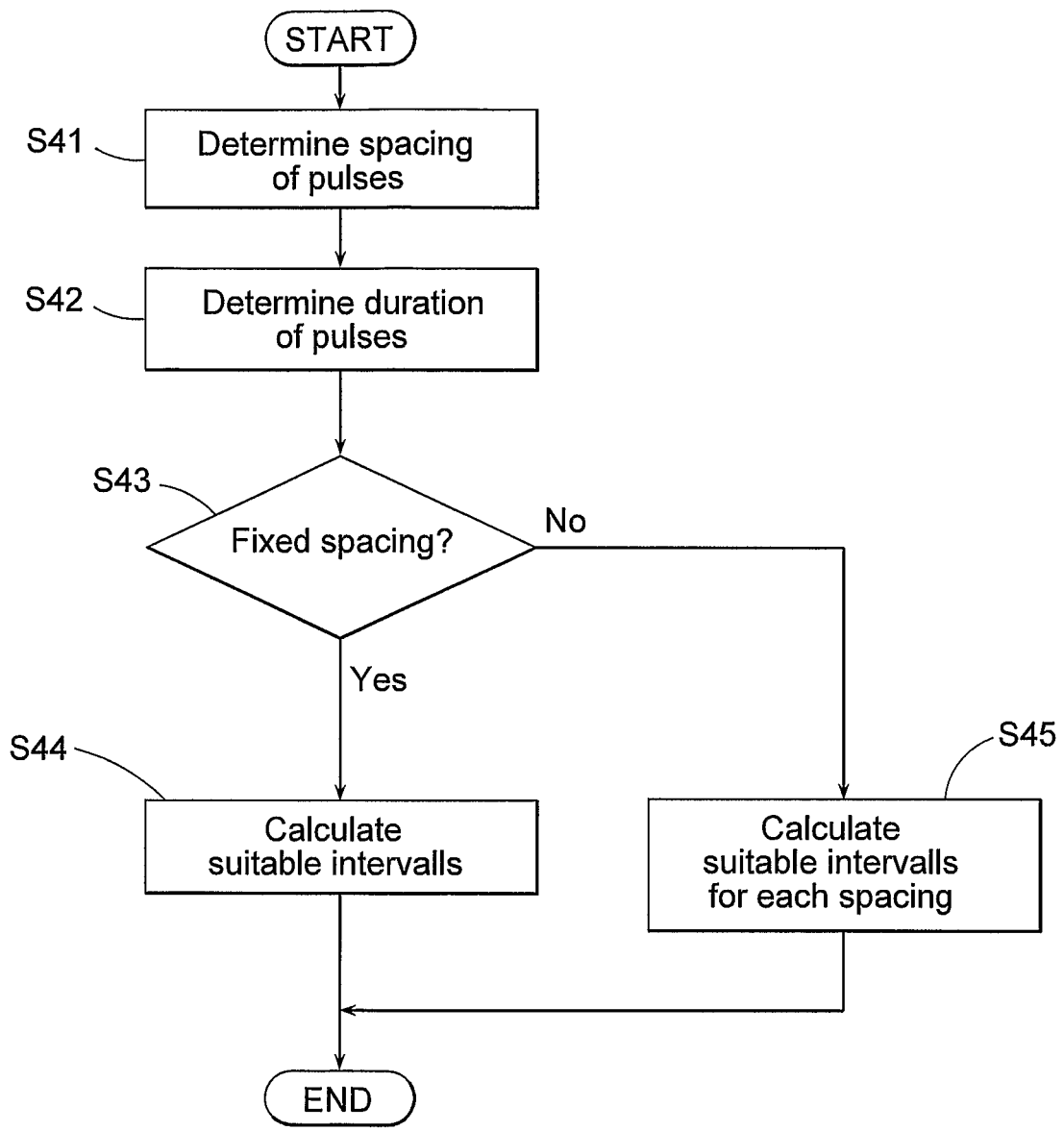
FIG. 4 is a flow chart of a first preferred embodiment of the inventive method.

Hence, according to the above, a method according to the invention may be as follows, as shown in FIG. 4:

In step S41 the spacing between periodic interfering pulses is determined.

In step S42 the duration of the pulses is determined.

If it is determined in step S43 that the pulses are evenly spaced, that is that the interfering pulses occur at regular time intervals, the procedure continues with step S44, in which suitable intervals in which to place the second primary synchronization symbol are calculated according to the equations above, that is, as (0,T/M), (T/2−T/(2M),T/2), (T/2, T/2+T/(2M)), or (T−T/M,T).

If it is determined in step S44 that the interfering pulses are not evenly spaced, but the spacing is known to assume a fixed number of intervals, suitable intervals are calculated in step S45 for each possible spacing of the interfering pulses. The system can then be made to switch between these positions. e.g. from frame to frame, according to a scheme, then the system can be made to switch between these positions, e.g. from frame to frame, according to a scheme, which is preferably predetermined.

If no periodic spacing of the interfering pulses can be determined in step S44, a pseudo-random spacing of the system sensitive data can be applied, as stated in step S45. A pseudo-random spacing can also be applied if the interfering pulses have a periodic spacing, for example, if the period cannot be determined.

A disadvantage of choosing a position for the second primary synchronization symbol that differs from T/2 is that if the terminal has detected one synchronization symbol, but needs to listen to another synchronization symbol to improve synchronization accuracy, it needs to search for the next synchronization symbol at two different time instances: T/2−T/(4M) and T/2+T/(4M) after the first synchronization symbol has been found. Note that the search for the next synchronization symbol is limited to these two possibilities also if the above mentioned alternating scheme is being used.

A further extension would be to also let the first primary synchronization symbol of the frame assume different positions in different frames. One could in principle also include more than two primary synchronization symbols per frame, selected among appropriate positions in analogy with the reasoning above.

In a system like LTE, where there is a secondary synchronisation symbol associated with each primary synchronisation symbol, the secondary synchronisation symbol could be made to include information about its position relative to the frame, or an indicator identifying such a position from a predetermined set of positions. This would facilitate synchronisation in the case where different positions of the synchronisation symbols are used in different frames.

Note that the techniques discussed here regarding synchronization symbols may in principle also be applied to other control signalling and sensitive information in the system. Such other information may be transmitted with a different periodicity than the synchronization signals, for example, three times per frame instead of two. This means that the intervals of the frames in which the information may be placed to avoid interfering pulses must be defined in accordance with the actual times of transmission of the information.

The mobile terminal may determine where to look for the time shifted sensitive data in a number of different ways, some of which will be discussed below.

Blind detection could be used, that is, trial and error between a predetermined set of different choices of possible positions for the sensitive data. In the case where different timing of the sensitive data is used depending on the geographical area, positioning data from a positioning system such as the Global Positioning System (GPS) could be used to determine the position of the radio base station and/or the mobile terminal. This position would be decisive for whether the sensitive data was shifted in time and possibly also for the new position in time. Alternatively, control signals holding information about the new points in time may be transmitted in a different frequency band, which is not interfered by the interfering signals. Control signals could also be sent in the current cell about time shifts used in other cells (to be used, for example, for "neighbour cell measurements" and/or handover). A fifth option would be to use control signalling from the current cell, such as a dedicated subcarrier broadcasting such information with a very low rate, possibly with strong channel coding and/or interleaving over a relatively long time, that is, a time that is significantly longer than the duration of the interfering pulse.

The invention claimed is:

1. A communications unit for use in a first cellular communications system, in which at least one type of system sensitive data including at least one of synchronization symbols, control signal and reference symbols, is arranged to be transmitted at at least one predetermined point in time within a plurality of frames, said communications unit comprising:
    a transmitter configured to transmit said system sensitive data at said at least one predetermined point in time; and
    a processing circuit configured to:
        determine, within at least one frame of said plurality of frames, at least one new point in time that is different from the at least one predetermined point in time; and
        control the transmitter to transmit, within the at least one frame of said plurality of frames, the system sensitive data at the at least one new point in time, instead of at said at least one predetermined point in time, to reduce the risk of interference from a second system operating in the same frequency range as the first cellular communications system, by avoiding, at least for one transmission of system sensitive data, a point in time in which there is interference from the second system; and
    wherein the communications unit is configured for use in a communications system in which data is transmitted in frames, and in which said at least one type of system sensitive data is arranged to be transmitted at at least a first and a second predetermined point in time in one frame, and wherein the processing circuit is configured to calculate a new point in time only for the second predetermined point in time.

2. A communications unit according to claim 1, wherein the processing circuit is configured to calculate said at least one new point in time on the basis of a minimum interval between interfering pulses from the second system.

3. A communications unit according to claim 1, wherein the processing circuit is configured to select the at least one new point in time from a table stored in association with the processor.

4. A communications unit according to claim 1, in which there is a plurality of predetermined points in time exhibiting a periodicity or regularity and the processing circuit is configured to calculate a plurality of new points in time having less periodicity or regularity.

5. A communications unit according to claim 1, wherein said system sensitive data comprises a first and a second synchronization symbol, wherein the processing circuit is configured to include in the first or second synchronization symbol information about the position of the first and/or the second synchronization symbol relative to the frame, or an indicator identifying such a position from a predetermined set of positions.

6. A communications unit according to claim 5, wherein said system sensitive data comprises a first and a second primary synchronization symbol and a first and a second secondary synchronization symbol, wherein the processor is configured to include in at least one of the first and second primary and secondary synchronization symbols information about the position of at least one of the synchronization symbols relative to the frame, or an indicator identifying such a position from a predetermined set of positions.

7. A communications unit according to claim 1, wherein the processing circuit is configured to determine said at least one new point in time in a pseudo-random time fashion.

8. A communications unit according to claim 1, wherein the communications unit is a radio base station.

9. A communications unit according to claim 1, wherein the communications unit is a mobile terminal.

10. A communications unit for use in a first cellular communications system, in which at least one type of system sensitive data including at least one of synchronization symbols, control signal and reference symbols, is arranged to be transmitted at at least one predetermined point in time within a plurality of frames, said communications unit comprising:
  a transmitter configured to transmit said system sensitive data at said at least one predetermined point in time; and
  a processing circuit configured to:
    determine, within at least one frame of said plurality of frames, at least one new point in time that is different from the at least one predetermined point in time;
    control the transmitter to transmit, within the at least one frame of said plurality of frames, the system sensitive data at the at least one new point in time, instead of at said at least one predetermined point in time, to reduce the risk of interference from a second system operating in the same frequency range as the first cellular communications system, by avoiding, at least for one transmission of system sensitive data, a point in time in which there is interference from the second system; and
    determine said at least one new point in time on the basis of the period of one frame and the interval between interference pulses from the second system.

11. A communications unit according to claim 10, wherein the processing circuit is configured to determine said at least one new point in time on the basis of the period of one frame and several different intervals between interference pulses from the second system.

12. A communication method for use in a first cellular communications system, in which at least one type of system sensitive data including at least one of synchronization symbols, control signal and reference symbol is arranged to be transmitted at at least one predetermined point in time within a plurality of frames, said method comprising:
  arranging at least one type of system sensitive data to be transmitted at at least one predetermined point in time within a plurality of frames;
  determining at least one new point in time different from the at least one predetermined point in time, for transmitting said at least one type of system sensitive data; and
  transmitting, within at least one frame of said plurality of frames, the system sensitive data at the at least one new point in time, instead of at said at least one predetermined point in time, to reduce the risk of interference from a second system operating in the same frequency range as the first cellular communications system, by avoiding, at least for one transmission of system sensitive data, a point in time in which there is interference from the second system;
  wherein data is transmitted in frames; and
  wherein said at least one type of system sensitive data is arranged to be transmitted at at least a first and a second predetermined point in time in one frame, wherein a new point in time is calculated only for the second predetermined point in time.

13. A method according to claim 12, further comprising calculating said at least one new point in time on the basis of a minimum interval between interfering pulses from the second system.

14. A method according to claim 12, further comprising selecting the at least one new point in time from a stored table.

15. A method according to claim 12, in which there is a plurality of predetermined points in time exhibiting a periodicity or regularity and a plurality of new points in time, calculated so that they have less periodicity or regularity.

16. A method according to claim 12, wherein said system sensitive data comprises a first and a second primary synchronization symbol and/or a first and a second secondary synchronization symbol, and wherein said method further comprises including in the first or second synchronization symbol information about the position of the secondary synchronization symbol relative to the frame, or an indicator identifying such a position from a predetermined set of positions.

17. A method according to claim 16, wherein said system sensitive data comprises a first and a second primary synchronization symbol and a first and a second secondary synchronization symbol, and wherein said method further comprises including in at least one of the first and second primary and secondary synchronization symbols information about the position of one of the synchronization symbols relative to the frame, or an indicator identifying such a position from a predetermined set of positions.

18. A method according to claim 12, wherein said at least one new point in time is determined in a pseudo-random time fashion.

19. A method according to claim 12, wherein the second system is a radar system, transmitting radar pulses in a frequency range that interferes with the cellular communications system.

20. A communication method for use in a first cellular communications system, in which at least one type of system sensitive data including at least one of synchronization symbols, control signal and reference symbol is arranged to be transmitted at at least one predetermined point in time within a plurality of frames, said method comprising:
  arranging at least one type of system sensitive data to be transmitted at at least one predetermined point in time within a plurality of frames;
  determining at least one new point in time different from the at least one predetermined point in time, for transmitting said at least one type of system sensitive data;
  transmitting, within at least one frame of said plurality of frames, the system sensitive data at the at least one new point in time, instead of at said at least one predetermined point in time, to reduce the risk of interference from a second system operating in the same frequency range as the first cellular communications system, by avoiding, at least for one transmission of system sensitive data, a point in time in which there is interference from the second system; and
  wherein said at least one new point in time is determined on the basis of the period of one frame and the interval between interference pulses from the second system.

21. A method according to claim 20, further comprising calculating said at least one new point in time on the basis of the period of one frame and several different intervals between interference pulses from the second system.

* * * * *